(12) United States Patent
Yang et al.

(10) Patent No.: US 11,196,107 B2
(45) Date of Patent: Dec. 7, 2021

(54) METHOD FOR RECYCLING LEAD PASTE IN SPENT LEAD-ACID BATTERY

(71) Applicant: Huazhong University of Science and Technology, Hubei (CN)

(72) Inventors: Jiakuan Yang, Hubei (CN); Kang Liu, Hubei (CN); Sha Liang, Hubei (CN); Ye Chen, Hubei (CN); Keke Xiao, Hubei (CN); Junxiong Wang, Hubei (CN); Wenhao Yu, Hubei (CN); Mingyang Li, Hubei (CN); Huijie Hou, Hubei (CN); Jingping Hu, Hubei (CN); Bingchuan Liu, Hubei (CN)

(73) Assignee: Huazhong University of Science and Technology, Hubei (CN)

( * ) Notice: Subject to any disclaimer, the term of this patent is extended or adjusted under 35 U.S.C. 154(b) by 309 days.

(21) Appl. No.: 16/446,000

(22) Filed: Jun. 19, 2019

(65) Prior Publication Data

US 2019/0305388 A1 Oct. 3, 2019

Related U.S. Application Data

(63) Continuation-in-part of application No. PCT/CN2017/107007, filed on Oct. 20, 2017.

(30) Foreign Application Priority Data

Sep. 13, 2017 (CN) .......................... 201710820603.X

(51) Int. Cl.
*H01M 10/54* (2006.01)
*C01G 21/06* (2006.01)
(Continued)

(52) U.S. Cl.
CPC ............ *H01M 10/54* (2013.01); *C01G 21/06* (2013.01); *C01G 21/16* (2013.01);
(Continued)

(58) Field of Classification Search
CPC ................................ H01M 10/54; C01G 21/06
(Continued)

(56) References Cited

U.S. PATENT DOCUMENTS 3,401,032 A * 9/1968 Renzoni ................. C01G 53/04
423/148
3,642,441 A * 2/1972 Van Weert .............. C22B 23/02
423/481
(Continued)

FOREIGN PATENT DOCUMENTS

CN 101613803 A 12/2009
CN 102723538 A 10/2012
(Continued)

OTHER PUBLICATIONS

International Search Report (English and Chinese) issued in PCT/CN2017/107007, dated May 31, 2018, 10 pages provided.
(Continued)

*Primary Examiner* — Melissa S Swain
(74) *Attorney, Agent, or Firm* — Hamre, Schumann, Mueller & Larson, P.C.

(57) ABSTRACT

The disclosure discloses a method for recycling lead paste in a spent lead-acid battery, comprising: (1) pretreating lead paste in a spent lead-acid battery as a raw material under vacuum; mixing the pretreated lead paste with a chlorination reagent to obtain reactants; and heating the reactants under vacuum to carry out a chlorination volatilization reaction, so that lead element in the pretreated lead paste is combined with chlorine element in the chlorination reagent to form lead chloride, which is then volatilized, and after the reaction is completed, chlorination residue and a crude lead chloride product are obtained by condensation and crystallization after volatilization; (2) purifying the crude lead chloride product obtained in the step (1) under vacuum to obtain a refined lead chloride product. The disclosure
(Continued)

improves the overall process flow of the recycling method as well as parameter conditions of the respective steps thereof, and can effectively solve the problem of serious pollution in lead paste recycling in the prior art.

10 Claims, 2 Drawing Sheets

(51) Int. Cl.
  *C01G 21/16* (2006.01)
  *H01M 10/06* (2006.01)

(52) U.S. Cl.
  CPC ......... *C01P 2006/80* (2013.01); *H01M 10/06* (2013.01); *Y02W 30/84* (2015.05)

(58) Field of Classification Search
  USPC .......................................................... 423/94
  See application file for complete search history.

(56) References Cited

U.S. PATENT DOCUMENTS

| | | | | |
|---|---|---|---|---|
| 4,092,152 | A | * | 5/1978 | Borbely .................... C22B 1/08 423/107 |
| 5,944,869 | A | * | 8/1999 | Modica ................. C22B 13/045 75/432 |
| 7,785,561 | B1 | * | 8/2010 | Smith .................... C01G 21/06 423/619 |

FOREIGN PATENT DOCUMENTS

| | | |
|---|---|---|
| CN | 104520240 A | 4/2015 |
| CN | 105226342 A | 1/2016 |
| CN | 106517318 A | 3/2017 |

OTHER PUBLICATIONS

Erzat et al., "Evaluation of lead recovery efficiency from waste CRT funnel glass by chlorinating volatilization process", Environmental Technology, vol. 35, Issue 22, published Jun. 4, 2014.

* cited by examiner

METHOD FOR RECYCLING LEAD PASTE IN SPENT LEAD-ACID BATTERY

BACKGROUND

Technical Field

The disclosure belongs to the technical field of electronic waste treatment and recycling, and more particularly relates to a method for recycling lead paste in a spent lead-acid battery, which can convert the lead paste of the spent lead-acid battery into a high-purity lead compound, and specifically, in this method, a reagent mixture of calcium chloride and silica is mixed with lead paste and then subjected to a chlorination volatilization reaction under vacuum to obtain a high-purity lead compound product by volatilization and condensation of lead chloride, which is especially suitable for recycling of lead and its compounds in lead paste in a spent lead-acid battery.

Description of the Related Art

With the rapid development of the economy, China's lead consumption continues to rise, and China has become a major country in the world for refined lead consumption. Currently, according to the consumption of 1.6 tons of mineral reserves per ton of lead concentrate in China. Since the smelting capacity is much higher than the output of mineral ores, the self-sufficiency rate of raw material supply is continuously decreasing, and the dependence on raw material imports is increasing. Therefore, there is a serious potential resource crisis in the production of mineral products in China. In addition, a large amount of lead-containing waste is produced during the production of the lead-acid batteries and after the service life of the batteries, and these spent lead-acid batteries are hazardous wastes, and may cause great harm to human health and the environment if not treated properly. Therefore, how to safely treat, dispose of and comprehensively utilize spent lead-acid batteries has become an urgent problem to be solved.

The whole spent lead-acid battery usually consists of the following four parts: 30 to 40% of lead paste, 11 to 30% of spent electrolyte, 24 to 30% of lead pole and lead alloy grid, and 22 to 30% of organic matter. Pretreatment methods of spent lead-acid battery vary greatly depending on the economic and technical level. In these pretreatment methods, the spent electrolyte is further treated and then discharged or reused; the grid mainly includes lead and its alloy, and can be recycled independently; organic materials such as polypropylene plastic can be recycled as by-products; the lead paste is mainly a slurry material formed by the active material on the polar plate after being charged and discharged: $PbSO_4$ (~55%), $PbO_2$ (~28%), $PbO$ (~9%), $Pb$ (~4%), etc., and generally also contain a small amount of impurities such as Fe, Sb and Ba (~0.5%). Lead paste, as a component of a spent lead-acid battery with the most complex composition, is not only a harmful substance that pollutes the environment, but also an important secondary resource for extracting valuable components. Since respective components of the spent lead-acid battery have different properties, the direct treatment of the spent-acid battery as a whole would result in low metal recovery and induce serious environmental pollution. Therefore, the respective components of the spent lead-acid battery should be separated and then treated separately to improve technical and economic indicators and reduce or even eliminate environmental pollution. Since lead paste contains a large amount of sulfate, and there are lead and its compounds in different valence states, the recycling of lead paste is usually a technical problem that needs to be studied in the recycling of spent lead-acid batteries.

At present, treatment technologies of spent lead-acid batteries mainly include pyrometallurgy and hydrometallurgy. In the past 20 years, the hydrometallurgy of spent lead-acid batteries has been extensively studied world widely and a series of new processes have been proposed. The hydrometallurgy of spent lead-acid batteries has the advantages of simple equipment, simple process, convenient operation, relatively high metal recovery, suitable scale and the like, and is worth further improvement and popularization. Developed countries are currently actively developing the wet technology, and it gradually transits to the development of the whole-wet technology. However, since lead is a heavy metal, the treatment of lead-containing waste liquid in the hydrometallurgical process is a significant environmental problem. In addition, lead leaching of lead-acid batteries by the hydrometallurgy often requires excessive amounts of strong acids and bases, which is prone to environmental pollution. Pyrometallurgy is to carry out pyrogenic mixed smelting after the spent lead-acid battery is simply treated by pouring acid, shelling and the like; after the spent lead-acid battery is crushed and sorted, the metal portion and the lead paste portion are separated, the lead paste is desulfurized and converted, and then they are separately subjected to pyrometallurgy. Due to the presence of lead sulfate, a large amount of sulfur-containing flue gas and volatile lead dust are easily produced in the pyrometallurgy process of spent lead paste. In addition, a manual labor is adopted, resulting in high labor intensity. Therefore, the traditional pyrogenic process not only has high energy consumption, but also has a large amount of pollutant emissions.

Lei Lixu et al. in Southeast University invented a method for recycling a spent lead-acid battery (see Chinese Patent Application No. 201510713121.5), main steps of which includes manually disassembling a spent lead-acid battery to obtain negative electrode powder and positive electrode powder, desulfurizing the negative electrode powder and heating the desulfurized negative electrode powder in air at 300° C. to 450° C. for oxidation to obtain negative electrode powder with good electrochemical activity, or desulfurizing the positive electrode powder and heating the desulfurized positive electrode powder in air at 400° C. to 600° C. with a reductant for reduction to obtain positive electrode powder with good electrochemical activity. However, the process may easily generate greenhouse gases such as carbon dioxide. Shandong Ruiyu Battery Co., Ltd. invented a spent lead paste treatment method (see Chinese Patent Application No. 201210228372.0), which reacts molten refined lead, spent lead paste powder and oxygen under heating conditions to obtain a lead-containing powder. However, this method is extremely easy to convert lead sulfate into sulfur dioxide which is then released.

In summary, although hydrometallurgy can prevent air pollution, there is a risk of waste liquid discharge. When lead paste in a spent lead-acid battery is treated by pyrometallurgy, the risk of pollutant gas emission is high and energy consumption is high during production. Therefore, in the process of treating spent lead paste, how to develop processes and related technologies in combination with the subsequent utilization of lead, which features low environmental pollution, high recovery rate, good economic and social benefits, is a problem worthy of attention.

SUMMARY

In view of the above-described defects or improvement requirements in the art, the present disclosure provides a method for recycling lead paste in a spent lead-acid battery, in which through improving the overall process flow of the recycling method as well as parameter conditions of the respective steps thereof. In particular, through adding calcium chloride and silica, mixing them with waste lead paste and performing a chlorination volatilization reaction under vacuum, lead compounds in the waste lead paste is converted into volatile lead chloride, which is then volatilized, thereby recycling high-purity lead compounds. The disclosure can effectively solve the problem of serious pollution in lead paste recycling in the prior art. In the disclosure, according to different types of lead paste in spent lead-acid batteries to be recycled, the residual amount of lead in the chlorination residue can be used as an index to optimize the optimum additive amount of calcium chloride and silica, and the chlorination volatilization temperature so as to minimize the residual amount of lead in the chlorination residue. In addition, the disclosure has no lead dust and gas emissions such as $SO_2$ emission compared with the lead recycling processes by the traditional pyrometallurgy, and has no waste liquid discharge compared with the lead recycling processes by hydrometallurgy, and thus is a zero-emission green lead recycling process. In the disclosure, vacuum pyrometallurgy is adopted, which does not produce lead-containing waste liquid, and the temperature required for chlorination evaporation is only 400 to 650° C. (e.g., 550° C.), which can greatly reduce the reaction energy consumption. Meanwhile, in the disclosure, the recovery of lead is higher compared with the traditional pyrometallurgy, and at least 68.5% (up to 99.7% or more) could be achieved, and the residual amount of lead in the chlorination residue is low, which significantly reduces the environmental risk. Moreover, the overall lead recycling process in the disclosure does not release chlorine gas and sulfur dioxide, which reduces the environmental load, and the recycling of the chlorination reagent can also significantly reduce the production cost, so that the process has considerable environmental benefits.

In order to achieve the above objective, according to the present disclosure, there is provided a method for recycling lead paste in a spent lead-acid battery, comprising:

(1) pretreating lead paste in a spent lead-acid battery as a raw material under vacuum to convert lead dioxide in the lead paste into lead oxide; mixing the pretreated lead paste with a chlorination reagent to obtain reactants, the chlorination reagent being used to provide chlorine element; and heating the reactants under vacuum to carry out a chlorination volatilization reaction, so that lead element in the pretreated lead paste is combined with chlorine element in the chlorination reagent to form lead chloride, which is then volatilized, and after the reaction is completed, chlorination residue and a crude lead chloride product are obtained by condensation and crystallization after volatilization;

(2) purifying the crude lead chloride product obtained in the step (1) under vacuum to separate other chloride impurities therein, thereby obtaining a refined lead chloride product.

Preferably, the method for recycling lead paste in a spent lead-acid battery further comprises the following step:

(3) dissolving the chlorination residue obtained in the step (1) with water, performing filtration to obtain a filtrate, and evaporating the filtrate to obtain a precipitate, preferably, the precipitate being used to constitute the chlorination reagent, and recycled for use in the step (1).

Further preferably, in the step (1), the chlorination reagent is a mixture of calcium chloride and silica; a temperature of the chlorination volatilization reaction and a ratio of the calcium chloride to the silica are optimized such that a residual amount of lead in the chlorination residue is minimized.

Further preferably, in the step (1), the chlorination volatilization reaction is carried out by heating at a vacuum pressure of 0.1 to $10^5$ Pa and a temperature of 400 to 650° C.; the chlorination reagent is a mixture of calcium chloride and silica, wherein a molar ratio of the calcium chloride to lead element in the pretreated lead paste is 12:1 to 30:1, and a molar ratio of the silica to lead element in the pretreated lead paste is 12:1 to 60:1; a percentage of lead element contained in the crude lead chloride product to lead element contained in the reactants is at least 68.5%, and preferably, a residual amount of lead in the chlorination residue is less than 0.05 mg/L.

Further preferably, in the step (2), the purification treatment is carried out by heating at a vacuum pressure of 0.1 to 1 Pa and a temperature of 200 to 400° C.; preferably, lead chloride in the refined lead chloride product has a purity of 99.8 wt % or more.

Further preferably, in the step (3), the evaporation treatment is carried out at a temperature of 100 to 120° C.

Further preferably, in the step (1), the lead paste raw material has a lead content of 70 to 75 wt %.

Compared with the prior art, in the above technical solution of the present disclosure, by using vacuum chlorination and volatilization technology, lead paste in a spent lead-acid battery can be converted into a high-purity lead compound product by adding a chlorination reagent (such as calcium chloride and silica) as additive reagents; since the chlorination volatilization reaction is carried out under vacuum, there are few by-products, the volatilization percentage of lead is high, the obtained lead compound has high purity and the secondary pollution in the chlorination recycling process is small, achieving the goal of zero discharge of waste water and toxic and harmful flue gas. In the present disclosure, a purification step is carried out such that the purity of lead chloride in the obtained refined lead chloride product is not less than 99.3 wt % (the purification step is preferably carried out at a vacuum pressure of 0.1 to 1 Pa and a temperature of 200 to 400° C.), and can be optimally at least 99.8 wt %.

In the disclosure, waste lead paste is converted by a vacuum chlorination volatilization process, and through optimization and control of the temperature and the addition ratio of calcium chloride to silica, lead in the waste lead paste is converted into a volatile lead compound. The method is applicable to spent lead-acid batteries with different components, and has a good guiding effect on the recycling of lead paste in different lead-acid batteries. In the chlorination reagent used in the disclosure, the molar ratio of calcium chloride to silica may be controlled to be (12 to 30):(12 to 60). In the disclosure, the chlorination volatilization reaction is preferably carried out by heating at a vacuum pressure of 0.1 to 10 Pa and a temperature of 400 to 650° C., and the chlorination reagent is a mixture of calcium chloride and silica, in which the usage amount of silicon satisfies that a molar ratio of silica to lead element in the lead paste is 12:1 to 60:1, and the usage amount of calcium chloride satisfies that a molar ratio of calcium chloride to lead element in the lead paste is 12:1 to 30:1. Through the overall cooperation of parameter conditions of the steps of the chlorination volatilization reaction, a residual amount of lead in the chlorination residue is reduced, and exhaust gas pollution caused by the decomposition of other raw materials or intermediate products (such as calcium sulfate) can also be avoided, which is suitable for lead paste of any type of spent lead-acid batteries (i.e., lead paste with different lead species and contents). Further preferably, the chlorination volatilization reaction is carried out by heating at a vacuum pressure of 1 Pa and a temperature of 550° C., and the chlorination reagent is a mixture of calcium chloride and silica, in which a molar ratio of silica to lead element is 36:1, and a molar ratio of calcium chloride to lead element is 30:1, so that a residual amount of lead in the chlorination residue obtained in the chlorination volatilization reaction is less than 0.05 mg/L, which is suitable for lead paste of any type of spent lead-acid batteries (i.e., lead paste with different lead species and contents).

The original waste lead paste has complex compositions, and contains lead and its compounds with various lead valences. The vacuum metallurgy recycling processes are mostly used for the direct recycling of various metals, and the treated metal-containing waste often has components with single valence. The pretreatment of lead paste can realize the transition of lead valence in the waste lead paste, and thus realize the transition from diversified lead compounds to single lead compound. By adding a composite chlorination reagent, lead recovery can be greatly improved, and sulfur and chlorine can be also fixed, avoiding $SO_2$ and chlorine emissions. Before the waste lead paste is chlorinated, the lead paste needs to be pretreated first to decompose lead dioxide in the lead paste and convert it into lead oxide, avoiding the following chlorination reaction: $PbO_2 + 2CaCl_2 + 2SiO_2 = PbCl_2 + 2CaSiO_3 + Cl_2$ (g)($\Delta G(400~650°$ C.$) < 0$).

In the pretreatment stage, the following reactions occurs in the waste lead paste: (1) $Pb + PbO_2 = 2PbO$, $\Delta G(400~650°$ C.$) < 0$; and (2) $PbO_2 = PbO + 0.5O_2(g)$, $\Delta G(400~650°$ C.$) < 0$. Through the above reactions, a combination of Pb, PbO, $PbO_2$, $PbSO_4$ and the like in waste lead paste transits to a combination of PbO, $PbSO_4$ and the like. In the chlorination reaction process, after lead chloride is volatilized, sulfate radical is successfully fixed in the residue based on the following reaction: $PbSO_4 + CaCl_2 = PbCl_2 + CaSO_4$. Calcium sulfate formed by the reaction has a decomposition temperature of up to 900° C. or higher($CaSO_4 = CaO + SO_3$ (g), $\Delta G_{900°C} = +77.1$ kJ/mol; $CaSO_4 = CaO + SO_2$ (g)$+0.5 O_2$(g), $\Delta G_{900°C} = +10.0$ kJ/mol). Therefore, sulfur is successfully fixed in the residue. In the secondary purification stage of the product, since the generated chloride (such as aluminum chloride, ferric chloride and arsenic chloride) impurities have a much lower saturated vapor pressure than that of lead chloride, a lead compound product with higher purity can be obtained by purification treatment at 200 to 400° C.

Since the traditional pyrometallurgy for recycling waste lead paste usually uses coke as a reducing agent, a large amount of lead dust and sulfur dioxide are produced during the smelting process. Hydrometallurgy usually uses strong acid and alkali, and thus it is easy to produce a large amount of waste water and threat human health. Therefore, in the present disclosure, vacuum chlorination and volatilization technology is adopted to convert lead paste in a spent lead-acid battery into a high-purity lead compound product, achieving zero emission of harmful gases throughout the lead recycling process, and thus the present disclosure has great technical advantages over the conventional processes. In addition, the method in the disclosure has simple steps, and has strong adaptability to the waste lead paste with different lead species; in the method, the waste lead paste can be converted into a high-purity lead compound product, and sulfate radical is also fixed, which reduces the environmental load. Moreover, the reagent cost is low, and thus the production cost can be saved, which is conducive to large-scale industrial production.

The difficulty of the present disclosure is that calcium chloride and silica are used as a chlorination reagent, and their ratio and the chlorination reaction temperature are precisely controlled to prevent the generated calcium sulfate from being decomposed and releasing $SO_x$ into the air again. In addition, decomposition of calcium sulfate in the product may be induced at inappropriate temperatures and cause secondary environmental pollution, and thus, an appropriate temperature interval should be selected. In the present disclosure, the chlorination volatilization reaction is carried out at a temperature of 400 to 650° C., and the usage amounts of calcium chloride and silica are controlled so that the molar ratio of calcium chloride to lead element is controlled to be 12:1 to 30:1, and the molar ratio of silica to lead element is controlled to be 12:1 to 60:1, which can effectively inhibit the decomposition of calcium sulfate. In addition, when the temperature is 550° C., the molar ratio of silica to lead element is 36:1, and the molar ratio of calcium chloride to lead element is 30:1, the chlorination residue obtained by the chlorination volatilization reaction has the minimum lead residual amount, which does not exceed 0.05. mg/L. In the disclosure, lead waste with different lead species could be recycled by using calcium chloride and silica as the chlorination reagent. The lead paste waste is converted into valuable recycled product via vacuum volatilization and condensation processes. The method has good adaptability to the waste lead paste with different lead species, and converts lead and its compounds with different amounts into lead chloride for recycling, which can be well applied to industrial production of waste lead paste from different sources.

The present disclosure converts lead paste in the lead-acid battery into a high-purity lead compound product by using a vacuum chlorination volatilization method. By optimizing the chlorination volatilization reaction temperature and the additive amounts of calcium chloride and silica, optimum recycling conditions of the lead compound (such as lead chloride) can be obtained. The method has the following two effects:

(1) The method can be adapted to waste lead paste with different lead species, and converts waste lead paste into a high-purity lead compound for recycling while avoiding the release of sulfur in the waste lead paste.

(2) The chlorination reagent in the disclosure preferably includes both calcium chloride and silica, and calcium chloride is used as a chlorine source in the chlorination reagent to convert lead and its compounds in the waste lead paste into a lead compound (such as lead chloride); Silica, as an auxiliary reagent in chlorination reagent, can promote the conversion of different lead species into a high-purity lead compound; the lead compound product obtained by volatilization and condensation can be further improved by secondary purification under vacuum; in addition, through the pretreatment of the waste lead paste, the environmental risk caused by the release of chlorine can be effectively reduced; through dissolution-filtration-evaporation treatments of the chlorination residue, a regenerated calcium chloride reagent that does not participate in the reaction can be obtained, which greatly improves the utilization rate of the reagents (especially the chlorination reagent), reduces the reagent cost and reduces the production budget. Therefore, the method has a certain industrial production value.

DETAILED DESCRIPTION OF THE EMBODIMENTS

For clear understanding of the objectives, features and advantages of the present disclosure, detailed description of the present disclosure will be given below in conjunction with accompanying drawings and specific embodiments. It should be noted that the embodiments described herein are only meant to explain the present disclosure, and not to limit the scope of the present disclosure. Furthermore, the technical features related to the embodiments of the disclosure described below can be mutually combined if they are not found to be mutually exclusive.

Figure 1:
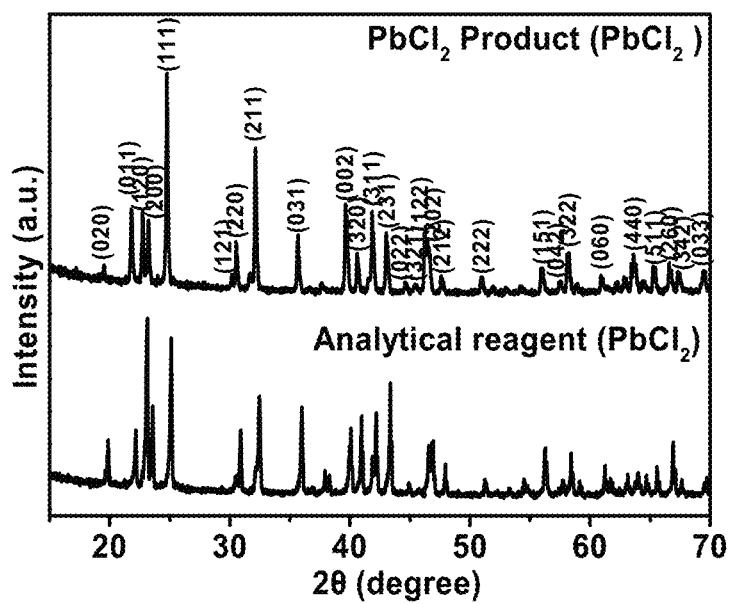
FIG. 1 shows XRD comparative patterns of the obtained lead chloride product and the analytically pure lead chloride product.
Figure 2:
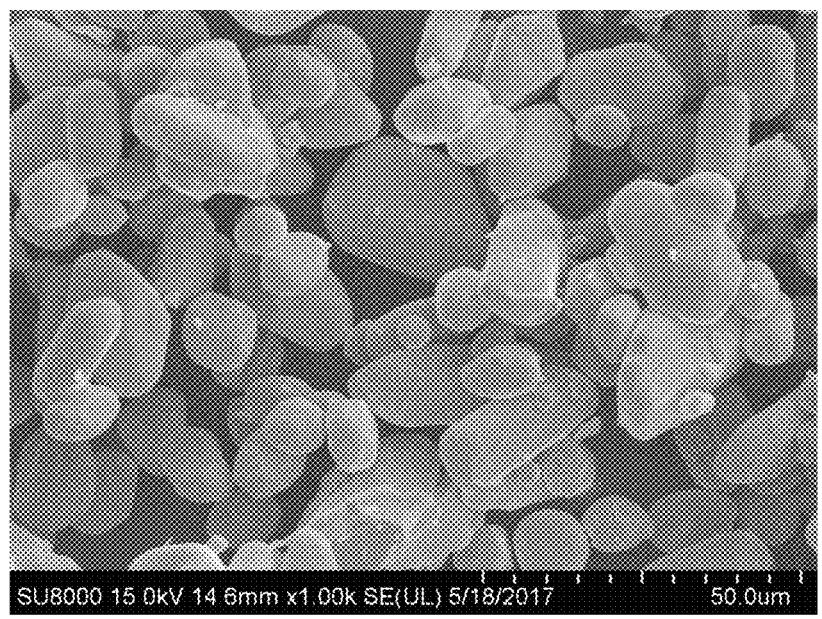
FIG. 2 shows an SEM photograph of the obtained lead chloride product.
Figure 3:
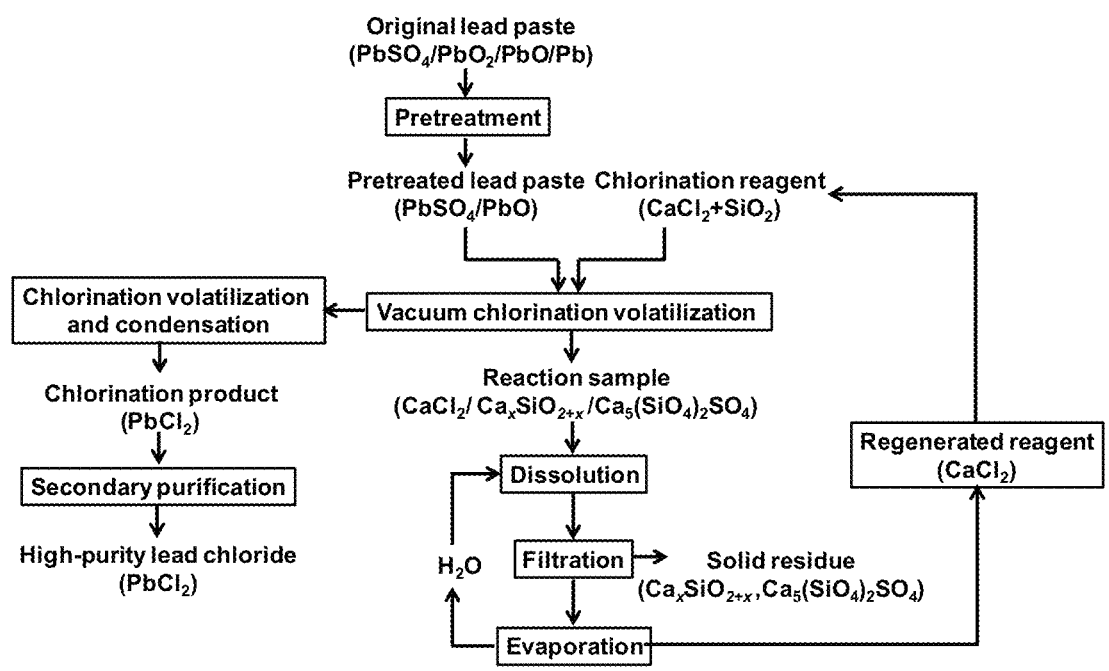
FIG. 3 shows a schematic flow chart of a method for recycling lead paste in a spent lead-acid battery according to the present disclosure.

In the present disclosure, the method for converting waste lead paste into a high-purity lead compound by a vacuum chlorination and volatilization process is a method for converting waste lead paste into a volatile lead compound by a vacuum chlorination and volatilization process, taking an example that the chlorination reagent is calcium chloride and silica (in the chlorination reagent, silica is used as an auxiliary reagent). As shown in FIG. 3, the method generally comprises the following steps:

S1: manually disassembling a spent lead-acid battery to obtain waste lead paste, and calcining the waste lead paste under vacuum at a specific temperature to decompose lead dioxide in the waste lead paste into lead oxide and oxygen.

S2: mixing the obtained pretreated waste lead paste with a mixture of calcium chloride and silica at a specific ratio, and performing a chlorination volatilization reaction under vacuum. Lead and lead oxides in the lead paste are converted into a volatile lead compound, and after the reaction is finished, a condensed lead compound product is collected on the tube wall; the condensed lead compound product is further purified by volatilizing chloride impurities in the lead compound product under vacuum at a specific temperature to obtain a secondary purified chlorination product.

S3: dissolving the chlorination residue in water, and regenerating the excess of chlorination reagent (such as an excess of calcium chloride) by dissolution-filtration-evaporation processes (the regenerated calcium chloride can be recycled).

Specifically, in the above step S1, there is no special requirement for component contents of lead and its compounds in the raw waste lead paste, and therefore the method has universality. Thus, the method has good adaptability to the waste lead paste with different species, and is applicable to most lead paste with a lead content of 70 to 75 wt %.

In the step S1, the lead paste may have a pretreatment temperature of 500° C., at which lead dioxide can be decomposed, and lead sulfate and lead oxide are retained in the sample due to their difficulty in volatility, so that only oxygen is released throughout the process.

In the above step S2, the chlorination temperature and the additive amounts of calcium chloride and silica (that is, calcium chloride and silica at a specific ratio) can be optimized by taking the residual amount of lead in the chlorination residue as an index to obtain optimal recycling conditions of the lead compound (i.e., an optimal dosing ratio of calcium chloride and silica and an optimal chlorination temperature). By subjecting the obtained lead compound product to secondary purification, a high-purity lead compound product can be obtained.

In the above step S3, the chlorination reaction residue is subjected to dissolution-filtration-separation, and specifically, the aqueous phase (i.e., filtrate) is evaporated to dryness at 100 to 120° C. to obtain regenerated calcium chloride.

By using calcium chloride and silica as a chlorination reagent, lead in waste lead paste is subjected to chlorination volatilization treatment under vacuum based on the volatility of lead chloride under vacuum, and the present disclosure will be further described in detail based on different chlorination temperatures.

Embodiment 1

2 g of waste lead paste (the lead content of the waste lead paste is 73.5 wt %, that is, there are $7.1 \times 10^{-3}$ mol of lead element in 2 g of waste lead paste) was calcined at a vacuum pressure of 1 Pa and 500° C. for 10 min to decompose lead dioxide in the waste lead paste into lead oxide. In addition, elemental lead is also oxidized by lead dioxide into lead oxide. The pretreated waste lead paste is uniformly mixed with a calcium chloride/silica reagent mixture having a molar ratio of calcium chloride to lead of 30:1 and a molar ratio of silica to lead of 60:1, and then heated at a vacuum pressure of 1 Pa and 400° C. for 30 min. After heating was finished, a volatilized and condensed lead chloride product was collected on the quartz tube wall. The volatilization percentage of lead chloride was calculated by calculating lead contents in the sample before and after the reaction by the acid digestion method, and thus the volatilization percentage of lead chloride was calculated to be 68.5 wt %. The collected lead chloride product is heated at a vacuum pressure of 1 Pa and 350° C. for 10 min to obtain a secondary purified lead chloride product, and the purity of lead chloride can reach 99.8 wt %. The chlorination residue was dissolved in deionized water, insoluble matters in the chlorination residue were separated by a vacuum suction device, and the filtrate was evaporated to dryness at 105° C. to obtain a regenerated calcium chloride reagent.

Embodiment 2

2 g of waste lead paste (the lead content of the waste lead paste is 73.5 wt %, that is, there are $7.1 \times 10^{-3}$ mol of lead element in 2 g of waste lead paste) was calcined at a vacuum pressure of 1 Pa and 500° C. for 10 min to decompose lead dioxide in the waste lead paste into lead oxide. In addition, elemental lead is also oxidized by lead dioxide into lead oxide. The pretreated waste lead paste is uniformly mixed with a calcium chloride/silica reagent mixture having a molar ratio of calcium chloride to lead of 30:1 and a molar ratio of silica to lead of 60:1, and then heated at a vacuum pressure of 1 Pa and 550° C. for 30 min. After heating was finished, a volatilized and condensed lead chloride product was collected on the quartz tube wall. The volatilization percentage of lead chloride was calculated by calculating lead contents in the sample before and after the reaction by the acid digestion method, and thus the volatilization percentage of lead chloride was calculated to be 99.7 wt %. The collected lead chloride product is heated at a vacuum pressure of 1 Pa and 350° C. for 10 min to obtain a secondary purified lead chloride product, and the purity of lead chloride can reach 99.8 wt %. The chlorination residue was dissolved in deionized water, insoluble matters in the chlorination residue were separated by a vacuum suction device, and the filtrate was evaporated to dryness at 105° C. to obtain a regenerated calcium chloride reagent.

Embodiment 3

2 g of waste lead paste (the lead content of the waste lead paste is 73.5 wt %, that is, there are $7.1 \times 10^{-3}$ mol of lead element in 2 g of waste lead paste) was calcined at a vacuum pressure of 1 Pa and 500° C. for 10 min to decompose lead dioxide in the waste lead paste into lead oxide. In addition, elemental lead is also oxidized by lead dioxide into lead oxide. The pretreated waste lead paste is uniformly mixed with a calcium chloride/silica reagent mixture having a molar ratio of calcium chloride to lead of 30:1 and a molar ratio of silica to lead of 60:1, and then heated at a vacuum pressure of 1 Pa and 650° C. for 30 min. After heating was finished, a volatilized and condensed lead chloride product was collected on the quartz tube wall. The volatilization percentage of lead chloride was calculated by calculating lead contents in the sample before and after the reaction by the acid digestion method, and thus the volatilization percentage of lead chloride was calculated to be 99.4 wt %. The collected lead chloride product is heated at a vacuum pressure of 1 Pa and 350° C. for 10 min to obtain a secondary purified lead chloride product, and the purity of lead chloride can reach 99.8 wt %. The chlorination residue was dissolved in deionized water, insoluble matters in the chlorination residue were separated by a vacuum suction device, and the filtrate was evaporated to dryness at 105° C. to obtain a regenerated calcium chloride reagent.

Embodiment 4

2 g of waste lead paste (the lead content of the waste lead paste is 73.5 wt %, that is, there are $7.1 \times 10^{-3}$ mol of lead element in 2 g of waste lead paste) was calcined at a vacuum pressure of 1 Pa and 500° C. for 10 min to decompose lead dioxide in the waste lead paste into lead oxide. In addition, elemental lead is also oxidized by lead dioxide into lead oxide. The pretreated waste lead paste is uniformly mixed with a calcium chloride/silica reagent mixture having a molar ratio of calcium chloride to lead of 30:1 and a molar ratio of silica to lead of 36:1, and then heated at a vacuum pressure of 1 Pa and 550° C. for 30 min. After heating was finished, a volatilized and condensed lead chloride product was collected on the quartz tube wall. The volatilization percentage of lead chloride was calculated by calculating lead contents in the sample before and after the reaction by the acid digestion method, and thus the volatilization percentage of lead chloride was calculated to be 99.7 wt %. The collected lead chloride product is heated at a vacuum pressure of 1 Pa and 350° C. for 10 min to obtain a secondary purified lead chloride product, and the purity of lead chloride can reach 99.8 wt %. The chlorination residue was dissolved in deionized water, insoluble matters in the chlorination residue were separated by a vacuum suction device, and the filtrate was evaporated to dryness at 105° C. to obtain a regenerated calcium chloride reagent.

Embodiment 5

2 g of waste lead paste (the lead content of the waste lead paste is 73.5 wt %, that is, there are $7.1 \times 10^{-3}$ mol of lead element in 2 g of waste lead paste) was calcined at a vacuum pressure of 1 Pa and 500° C. for 10 min to decompose lead dioxide in the waste lead paste into lead oxide. In addition, elemental lead is also oxidized by lead dioxide into lead oxide. The pretreated waste lead paste is uniformly mixed with a calcium chloride/silica reagent mixture having a molar ratio of calcium chloride to lead of 12:1 and a molar ratio of silica to lead of 60:1, and then heated at a vacuum pressure of 1 Pa and 550° C. for 30 min. After heating was finished, a volatilized and condensed lead chloride product was collected on the quartz tube wall. The volatilization percentage of lead chloride was calculated by calculating lead contents in the sample before and after the reaction by the acid digestion method, and thus the volatilization percentage of lead chloride was calculated to be 93.7 wt %. The collected lead chloride product is heated at a vacuum pressure of 1 Pa and 350° C. for 10 min to obtain a secondary purified lead chloride product, and the purity of lead chloride can reach 99.8 wt %. The chlorination residue was dissolved in deionized water, insoluble matters in the chlorination residue were separated by a vacuum suction device, and the filtrate was evaporated to dryness at 105° C. to obtain a regenerated calcium chloride reagent.

Embodiment 6

2 g of waste lead paste (the lead content of the waste lead paste is 73.5 wt %, that is, there are $7.1 \times 10^{-3}$ mol of lead element in 2 g of waste lead paste) was calcined at a vacuum pressure of 1 Pa and 500° C. for 10 min to decompose lead dioxide in the waste lead paste into lead oxide. In addition, elemental lead is also oxidized by lead dioxide into lead oxide. The pretreated waste lead paste is uniformly mixed with a calcium chloride/silica reagent mixture having a molar ratio of calcium chloride to lead of 30:1 and a molar ratio of silica to lead of 12:1, and then heated at a vacuum pressure of 1 Pa and 550° C. for 30 min. After heating was finished, a volatilized and condensed lead chloride product was collected on the quartz tube wall. The volatilization percentage of lead chloride was calculated by calculating lead contents in the sample before and after the reaction by the acid digestion method, and thus the volatilization percentage of lead chloride was calculated to be 87.2 wt %. The collected lead chloride product is heated at a vacuum pressure of 1 Pa and 350° C. for 10 min to obtain a secondary purified lead chloride product, and the purity of lead chloride can reach 99.8 wt %. The chlorination residue was dissolved in deionized water, insoluble matters in the chlorination residue were separated by a vacuum suction device, and the filtrate was evaporated to dryness at 105° C. to obtain a regenerated calcium chloride reagent.

Embodiment 7

2 g of waste lead paste (the lead content of the waste lead paste is 73.5 wt %, that is, there are $7.1 \times 10^{-3}$ mol of lead element in 2 g of waste lead paste) was calcined at a vacuum pressure of 1 Pa and 500° C. for 10 min to decompose lead dioxide in the waste lead paste into lead oxide. In addition, elemental lead is also oxidized by lead dioxide into lead oxide. The pretreated waste lead paste is uniformly mixed with a calcium chloride/silica reagent mixture having a molar ratio of calcium chloride to lead of 30:1 and a molar ratio of silica to lead of 36:1, and then heated at a vacuum pressure of $10^5$ Pa and 550° C. for 30 min. After heating was finished, a volatilized and condensed lead chloride product was collected on the quartz tube wall. The volatilization percentage of lead chloride was calculated by calculating lead contents in the sample before and after the reaction by the acid digestion method, and thus the volatilization percentage of lead chloride was calculated to be 67.3 wt %. The collected lead chloride product is heated at a vacuum pressure of 1 Pa and 350° C. for 10 min to obtain a secondary purified lead chloride product. The chlorination residue was dissolved in deionized water, insoluble matters in the chlorination residue were separated by a vacuum suction device, and the filtrate was evaporated to dryness at 105° C. to obtain a regenerated calcium chloride reagent.

Embodiment 8

2 g of waste lead paste (the lead content of the waste lead paste is 73.5 wt %, that is, there are $7.1 \times 10^{-3}$ mol of lead element in 2 g of waste lead paste) was calcined at a vacuum pressure of 1 Pa and 500° C. for 10 min to decompose lead dioxide in the waste lead paste into lead oxide. In addition, elemental lead is also oxidized by lead dioxide into lead oxide. The pretreated waste lead paste is uniformly mixed with a calcium chloride/silica reagent mixture having a molar ratio of calcium chloride to lead of 30:1 and a molar ratio of silica to lead of 36:1, and then heated at a vacuum pressure of $10^3$ Pa and 550° C. for 30 min. After heating was finished, a volatilized and condensed lead chloride product was collected on the quartz tube wall. The volatilization percentage of lead chloride was calculated by calculating lead contents in the sample before and after the reaction by the acid digestion method, and thus the volatilization percentage of lead chloride was calculated to be 85.7 wt %. The collected lead chloride product is heated at a vacuum pressure of 1 Pa and 350° C. for 10 min to obtain a secondary purified lead chloride product. The chlorination residue was dissolved in deionized water, insoluble matters in the chlorination residue were separated by a vacuum suction device, and the filtrate was evaporated to dryness at 105° C. to obtain a regenerated calcium chloride reagent.

Embodiment 9

2 g of waste lead paste (the lead content of the waste lead paste is 73.5 wt %, that is, there are $7.1 \times 10^{-3}$ mol of lead element in 2 g of waste lead paste) was calcined at a vacuum pressure of 1 Pa and 500° C. for 10 min to decompose lead dioxide in the waste lead paste into lead oxide. In addition, elemental lead is also oxidized by lead dioxide into lead oxide. The pretreated waste lead paste is uniformly mixed with a calcium chloride/silica reagent mixture having a molar ratio of calcium chloride to lead of 30:1 and a molar ratio of silica to lead of 36:1, and then heated at a vacuum pressure of 10 Pa and 550° C. for 30 min. After heating was finished, a volatilized and condensed lead chloride product was collected on the quartz tube wall. The volatilization percentage of lead chloride was calculated by calculating lead contents in the sample before and after the reaction by the acid digestion method, and thus the volatilization percentage of lead chloride was calculated to be 99.6 wt %. The collected lead chloride product is heated at a vacuum pressure of 1 Pa and 350° C. for 10 min to obtain a secondary purified lead chloride product. The chlorination residue was dissolved in deionized water, insoluble matters in the chlorination residue were separated by a vacuum suction device, and the filtrate was evaporated to dryness at 105° C. to obtain a regenerated calcium chloride reagent.

In the present disclosure, the chlorination volatilization reaction may be carried out by using a conventional high-temperature chlorination resistant apparatus. In the present disclosure, in addition to the preferable vacuum conditions in the above embodiments, other vacuum conditions can be adopted, as long as the vacuum pressure is much less than 1 standard atmospheric pressure (this experiment can be carried out at a vacuum pressure of 0.1 to $10^5$ Pa. Preferably, the vacuum pressure of the chlorination volatilization reaction is 0.1 to 10 Pa, and the vacuum pressure of the purification reaction is 0.1 to 1 Pa. The smaller the pressures, the better the effect).

It should be readily understood to those skilled in the art that the above description is only preferred embodiments of the present disclosure, and does not limit the scope of the present disclosure. Any change, equivalent substitution and modification made without departing from the spirit and scope of the present disclosure should be included within the scope of the protection of the present disclosure.

What is claimed is:

1. A method for recycling lead paste in a spent lead-acid battery, comprising:
   pretreating lead paste in a spent lead-acid battery as a raw material under vacuum to convert lead dioxide in the lead paste into lead oxide; mixing the pretreated lead paste with a chlorination reagent to obtain reactants, the chlorination reagent being used to provide a chlorine element; and heating the reactants under vacuum to carry out a chlorination volatilization reaction, so that a lead element in the pretreated lead paste is combined with the chlorine element in the chlorination reagent to form lead chloride, which is then volatilized, and after the reaction is completed, chlorination residue and a crude lead chloride product are obtained by condensation and crystallization after volatilization; and
   purifying the crude lead chloride product under vacuum to separate other chloride impurities therein, thereby obtaining a refined lead chloride product.

2. The method for recycling lead paste in a spent lead-acid battery according to claim 1, further comprising:
   dissolving the chlorination residue with water, performing filtration to obtain a filtrate, and evaporating the filtrate to obtain a precipitate.

3. The method for recycling lead paste in a spent lead-acid battery according to claim 1, wherein the chlorination reagent is a mixture of calcium chloride and silica; and
   a temperature of the chlorination volatilization reaction and a ratio of the calcium chloride to the silica are optimized such that a residual amount of lead in the chlorination residue is minimized.

4. The method for recycling lead paste in a spent lead-acid battery according to claim 1, wherein the chlorination volatilization reaction is carried out by heating at a vacuum pressure of 0.1 to $10^5$ Pa and a temperature of 400 to 650° C.;
   the chlorination reagent is a mixture of calcium chloride and silica, wherein a molar ratio of the calcium chloride to the lead element in the pretreated lead paste is 12:1 to 30:1, and a molar ratio of the silica to the lead element in the pretreated lead paste is 12:1 to 60:1; and
   a percentage of lead element contained in the crude lead chloride product relative to lead element contained in the reactants is at least 68.5%.

5. The method for recycling lead paste in a spent lead-acid battery according to claim 1, wherein the step of purifying the crude lead chloride product is carried out by heating at a vacuum pressure of 0.1 to 1 Pa and a temperature of 200 to 400° C.

6. The method for recycling lead paste in a spent lead-acid battery according to claim 2, wherein the step of evaporating the filtrate is carried out at a temperature of 100 to 120° C.

7. The method for recycling lead paste in a spent lead-acid battery according to claim 1, wherein the lead paste has a lead content of 70 to 75 wt %.

8. The method for recycling lead paste in a spent lead-acid battery according to claim 2, further comprising constituting the chlorination reagent from the precipitate.

9. The method for recycling lead paste in a spent lead-acid battery according to claim 1, wherein a residual amount of lead in the chlorination residue is less than 0.05 mg/L.

10. The method for recycling lead paste in a spent lead-acid battery according to claim 1, wherein lead chloride in the refined lead chloride product has a purity of 99.8 wt % or more.

* * * * *